United States Patent
Paalasmaa et al.

(10) Patent No.: US 6,527,671 B2
(45) Date of Patent: Mar. 4, 2003

(54) PLANETARY GEAR TRANSMISSION WITH VARIABLE RATIO

(75) Inventors: Seppo Lauri Paalasmaa, Kauniainen (FI); Pekka Juhani Hautala, Espoo (FI); Petri Erkki Michael Makkonen, Helsinki (FI)

(73) Assignee: Prorauta, Espoo (FI)

( * ) Notice: Subject to any disclaimer, the term of this patent is extended or adjusted under 35 U.S.C. 154(b) by 0 days.

(21) Appl. No.: 09/885,197

(22) Filed: Jun. 20, 2001

(65) Prior Publication Data

US 2002/0002097 A1 Jan. 3, 2002

(30) Foreign Application Priority Data

Jun. 21, 2000 (FI) .............................................. 20001478

(51) Int. Cl.[7] .............................................. F16H 59/74
(52) U.S. Cl. ......................................... 477/99; 477/104
(58) Field of Search .................................... 477/99, 104

(56) References Cited

U.S. PATENT DOCUMENTS

| | | | |
|---|---|---|---|
| 868,935 A | * | 10/1907 | Munsing |
| 943,985 A | * | 12/1909 | Morris |
| 2,982,153 A | * | 5/1961 | Albertson et al. |
| 4,406,178 A | | 9/1983 | Gillade |
| 4,497,221 A | | 2/1985 | Koser |
| 4,890,513 A | * | 1/1990 | Way, Jr. |
| 5,645,506 A | * | 7/1997 | Mleczko |

FOREIGN PATENT DOCUMENTS

| | | |
|---|---|---|
| CH | 658890 | 3/1983 |
| DE | 66235 | 9/1938 |
| DE | 2421841 | 1/1975 |
| DE | 3806292 | 9/1989 |
| DE | 19751231 | 6/1999 |
| EP | 0748953 | 12/1996 |
| GB | 2287512 | 9/1995 |
| WO | 9315337 | 8/1993 |
| WO | 9850715 | 11/1998 |

* cited by examiner

Primary Examiner—Dirk Wright
(74) Attorney, Agent, or Firm—Ware, Fressola, Van Der Sluys & Adolphson

(57) ABSTRACT

A planetary gear transmission with a steplessly adjustable transmission ratio where the gear transmission comprises a first and second sun gear (11, 12) arranged on a first and second operating shaft (7;8), and first (1) and second planetary gears (2) connectable thereto, each of which sun gears is rigidly attached by a shaft (6) to the first planetary gears (1), so that the first and second planetary gears form planetary gear pairs (B1). The gear transmission includes only one planetary carrier (5). By means of coupling means (50), the whole rotary force or part thereof is taken out of the planetary gear and/or fed therein, either via said first or second operating shaft (7;8), or via an alternative planetary carrier. By using at least one operation means (15, 16, 17, 23, 24, 25, 26, 37), the planetary carrier rotation velocity ($\phi$) is controlled to remain locked stationary or to be freely rotatable.

26 Claims, 6 Drawing Sheets

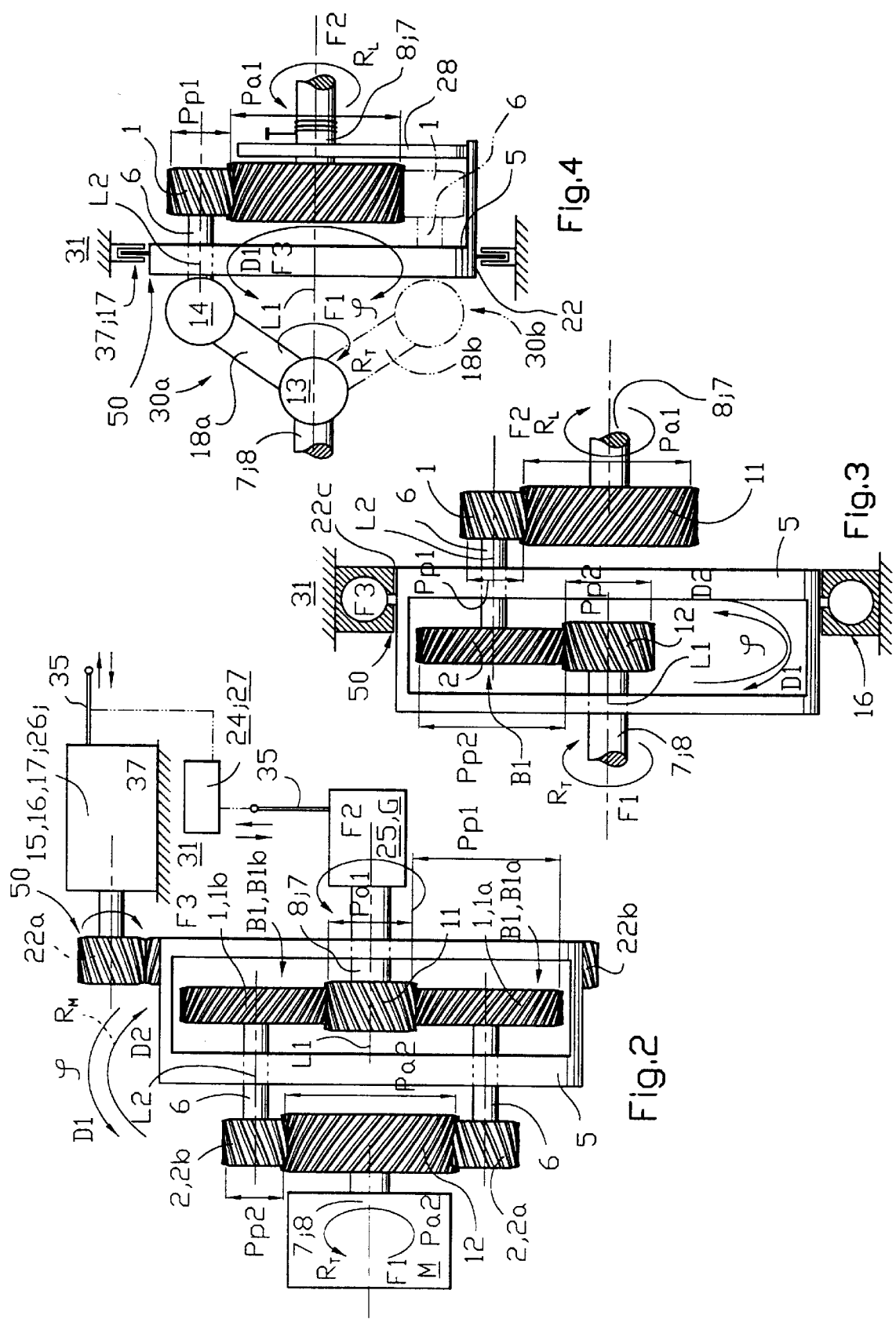

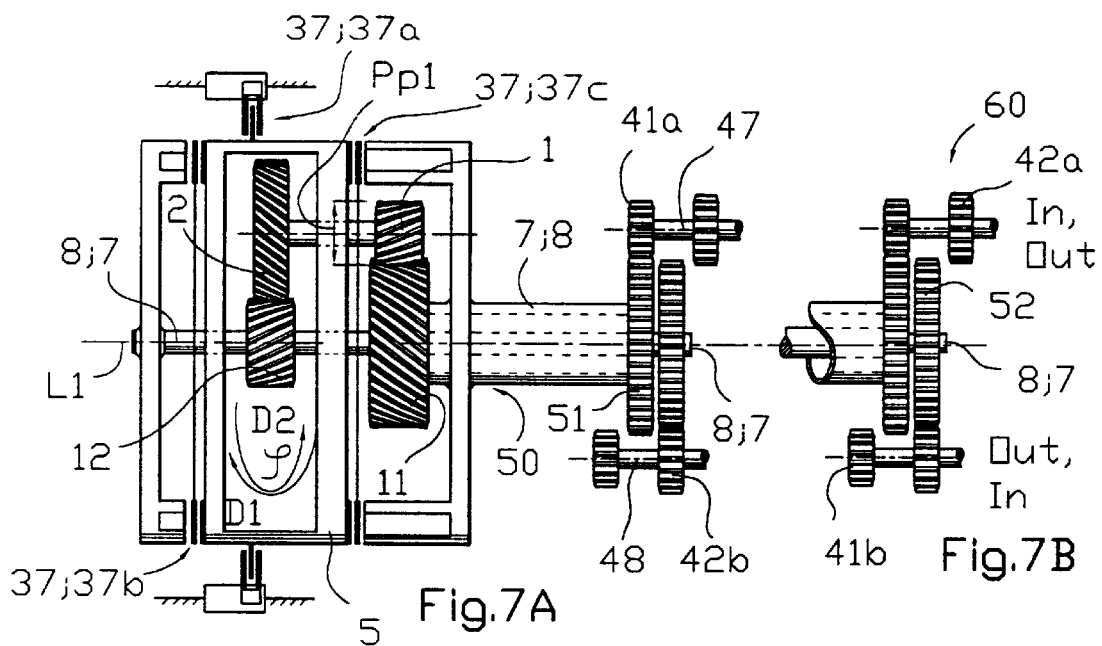
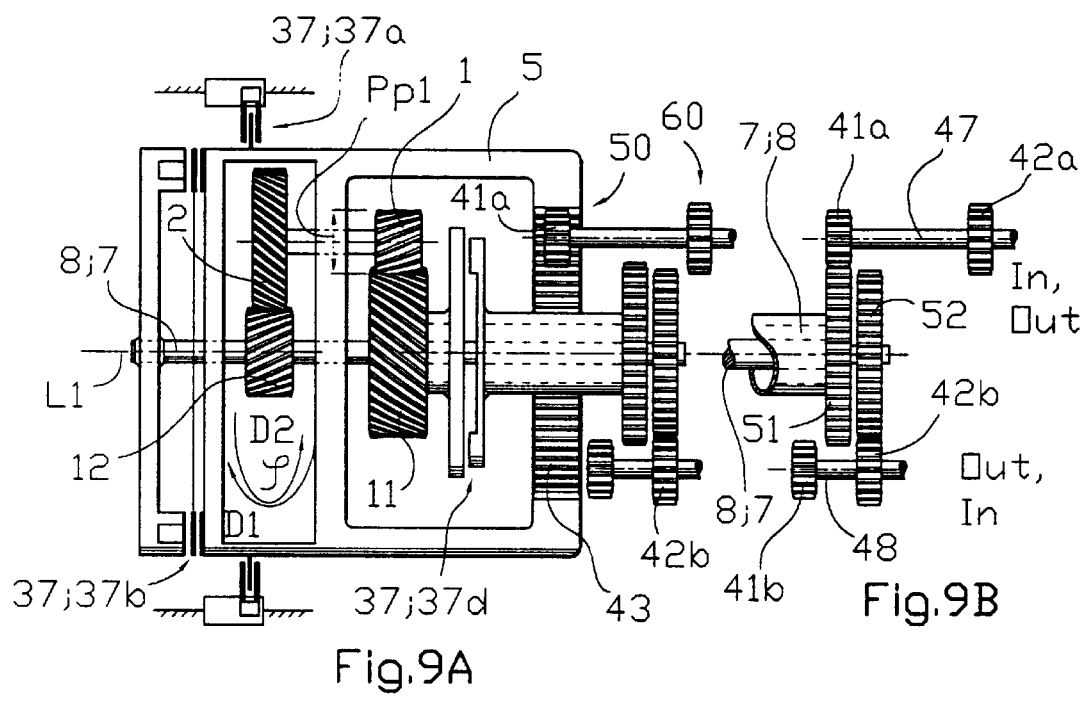

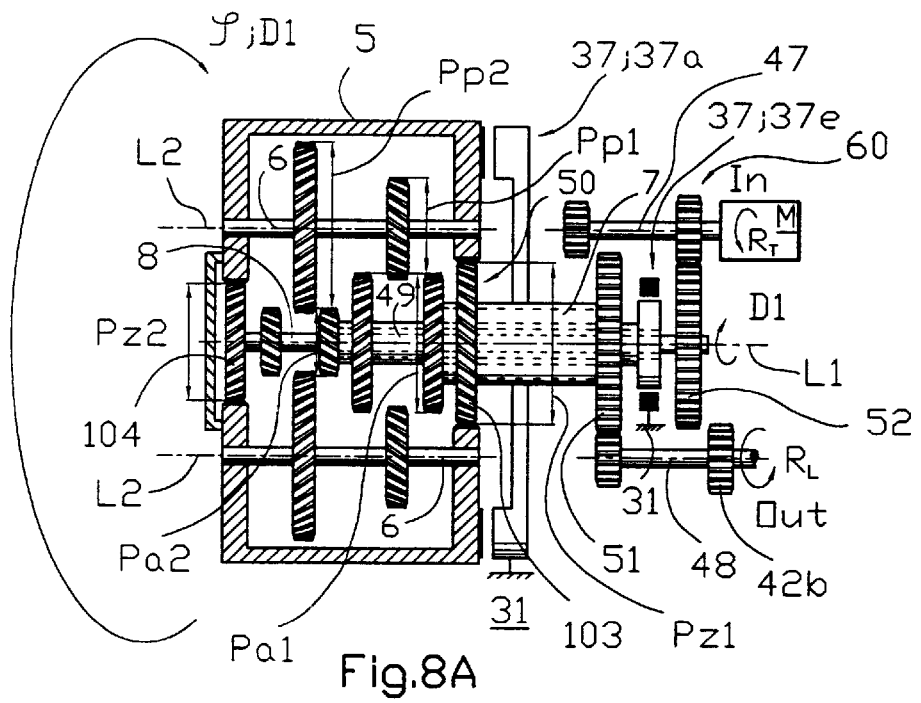
Fig.8A
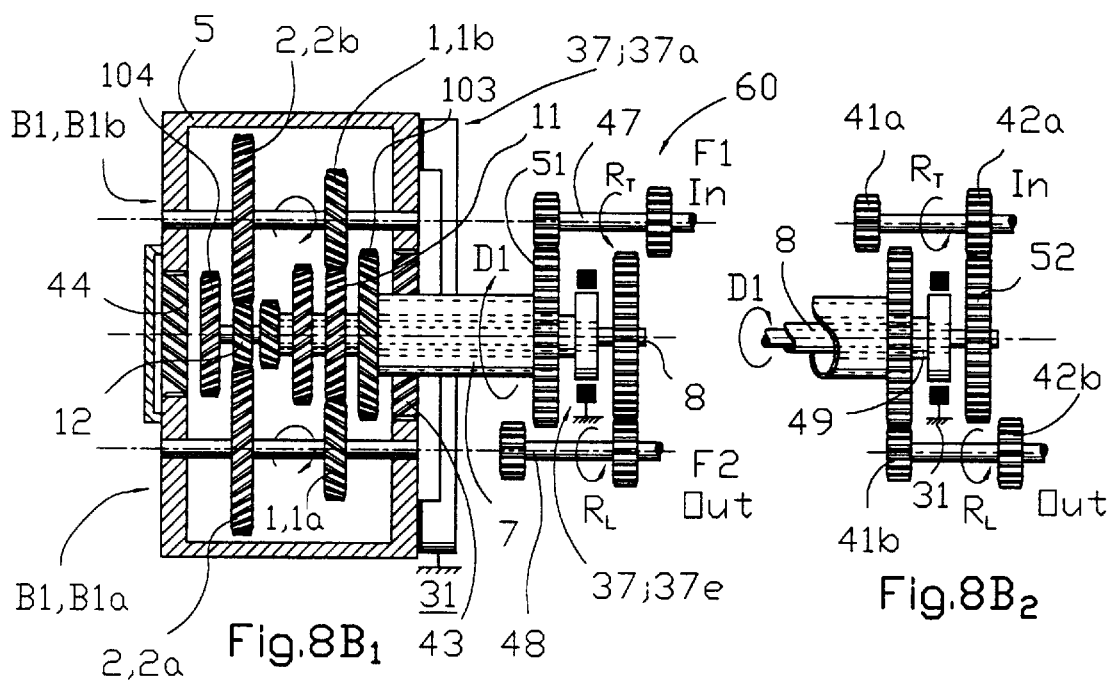
Fig.8B₁   Fig.8B₂

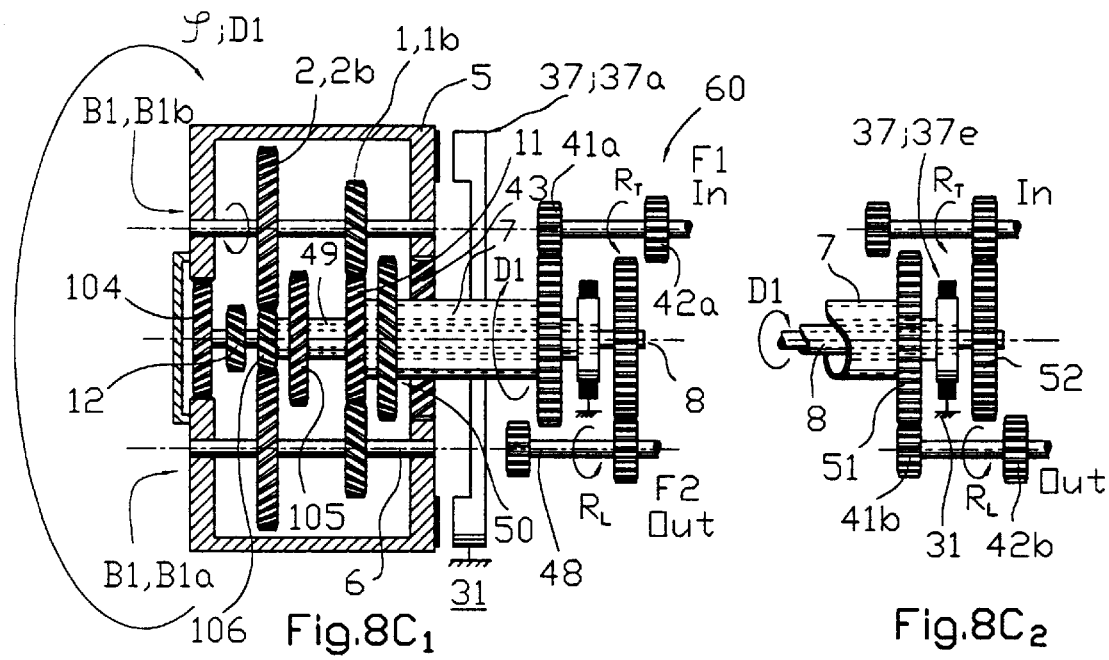
Fig.8C₁  Fig.8C₂
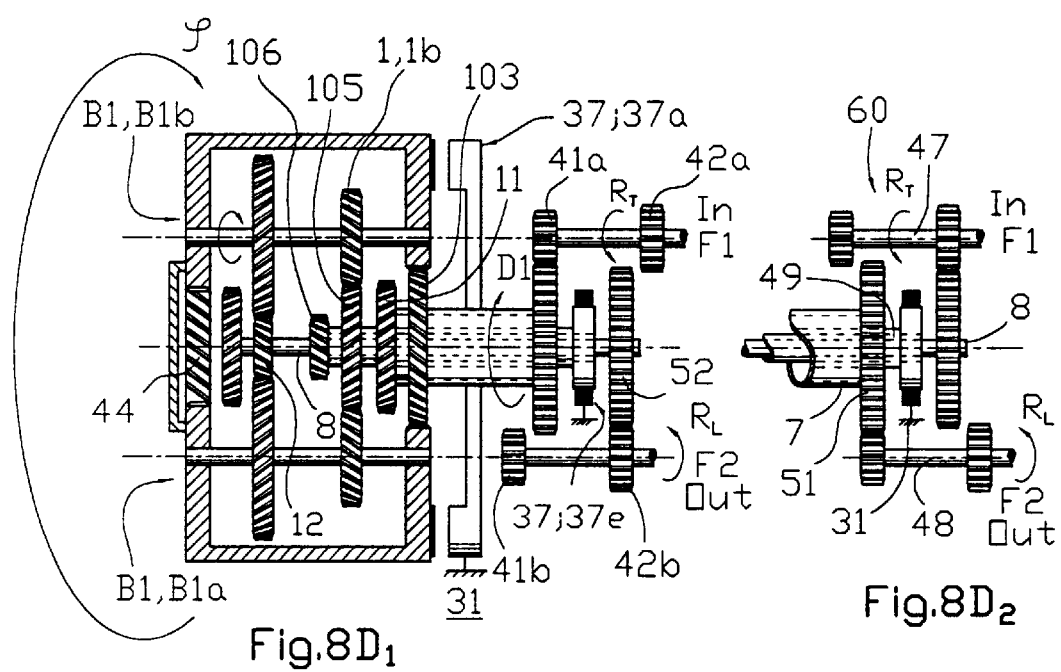
Fig.8D₁  Fig.8D₂

PLANETARY GEAR TRANSMISSION WITH VARIABLE RATIO

TECHNICAL FIELD

The invention relates to a planetary gear transmission with an variable transmission ratio, without a ring gear wheel, and comprising: a first sun gear arranged on a first operating shaft and at least one first planetary gear connectable thereto; a second sun gear arranged on a second operating shaft and at least one second planetary gear connectable thereto; planetary shafts, rigidly attaching each of the second planetary gears to one of the first planetary gears, in which case the first and the second planetary gears form first pairs of planetary gears, in which the planetary gears rotate at the same angular speed; and a planetary carrier that is common for the first and second planetary gears.

BACKGROUND OF THE INVENTION

For instance from the publications WO-93/15337, WO-98/50715, there are known planetary gear transmissions that are compiled, in a conventional manner, of one sun gear, one series of corresponding—planetary gears and a ring gear wheel, so that the transmission ratio of their planetary gear transmissions can be adjusted for example by slowing down the ring gear wheel either mechanically or by means of a generator or a or hydraulic pump. According to both of said publications, the primary motor rotates the sun gear, and power is taken out of the gear arrangement to the target of usage from the planetary carrier. The publication DE-197 51 231 A1 describes a structure that in other ways corresponds to the ones disclosed in the above mentioned publications, but as an inverted arrangement, i.e. the power is brought into the planetary carrier of the gear transmission and it is taken out of the gear transmission to the target of usage from the sun gear. Here the ring gear wheel is slowed down by means of an AC inverter. The publications EP-0 748 953 A3 and GB-2 287 512 A describe somewhat different usages of a planetary gear transmission, although the planetary gear transmissions themselves represent exactly the same type as above. In said latter arrangements, the primary motor rotates the ring gear wheel, and the power is taken out of the gear transmission to the target of usage from the sun gear, whereas the transmission ratio is controlled by braking the planetary gears. In the above-described structures, the initial problem is the relatively small ratio of transformation, i.e. the difference between the largest and smallest transmissions, which is obtained by adjusting the speed of the ring gear wheel. For example in the publication WO-98/50715, the speed difference is said to be 2:1–3:1. In addition, in these structures a relatively large amount of energy is consumed in the braking of the ring gear wheel, which energy is removed from the power of the output shaft and requires, due to said large amount, as the papers teach, components that take up a lot of space and/or are heavy in structure. Another drawback is the complicated construction, especially in the case of the patent EP-0 748 953.

The publications DE-666 235, DE-38 06 292 and U.S. Pat. No. 4,406,178 introduce planetary gear transmissions without ring gear wheels, with a transmission ratio that can be steplessly adjusted. In these gear transmission arrangements, on the input shaft there is arranged a sun gear to which one set of planetary gears is connected, and on the output shaft there is arranged a second sun gear, to which the second set of planetary gears is connected. The planetary gears are non-rotatably connected to each other by means of axles attached with bearings to the rotary planetary carrier, in which case the planetary gears rotate at the same angular velocity. The transmission ratio of the planetary gear transmission is adjusted by braking the planetary carrier either by means of a friction brake, which is coupled either between the planetary carrier and the housing of the device or between the planetary carrier and the input shaft, or by arranging belt transmission between the planetary carrier and the input shaft. Also in these arrangements, the drawback is a fairly low ratio of transformation, i.e. the difference between the largest and the smallest transmission. Another drawback is a high loss of energy, which means that the efficiency of the suggested arrangements is low.

SUMMARY OF THE INVENTION

The object of the invention is to realize a mechanical gear transmission with a transmission ratio that can be variable of steplessly adjusted within a wide margin, while one or several of the transition ratios can be locked at a fixed value and again released according to the situation of usage. A second object of the invention is this kind of variable, mechanical gear transmission that achieves a minimal lossin efficiency. A third object of the invention is this kind of stepless mechanical gear transmission, where a stepless or sliding change in the transmission ration can be achieved by many different, alternative ways. Yet another object off the invention is this kind of gear transmission that is simple in structure and possibly small in size.

The object of the invention is to realize a mechanical gear transmission with a transmission ratio that can be variable or steplessly adjusted within a wide marginal, while one or several of the transmission ratios can be locked at a fixed value and again released according to the situation of usage. A second object of the invention is this kind of variable, mechanical gear transmission that achieves a minimal loss in efficiency. A third object of the invention n is this kind of stepless mechanical gear transmission, where a stepless or sliding change in the transmission ratio can be achieved by many different, alternative ways. Yet another object of the invention is this kind of gear transmission that is simple in structure and possibly small in size.

The above described problems are solved and objects achieved by means of a planetary gear transmission with a variable transmission ratio, without a ring gear wheel, comprising: a first sun gear arranged on a first operating shaft and at least one first planetary gear connectable thereto; a second sun gear arranged on a second operating shaft and at least one second planetary gear connectable thereto; planetary shafts rigidly attaching each of the second planetary gears to one of the first planetary gears, in which case the first and second planetyary gears form first planetary gear pairs, where the planetary gears rotate at the same angular velocity; and a planetary carrier common to the first and second planetary gears; and further comprising, as a combination one or several coupling means for taking out the whole rotary force or part thereof from the planetary gear transmission, and/or for feeding it into the planetary gear transmission, alternatively: either via said first or second operating shaft; or via the planetary carrier; and at least to a first mode, where the planetary carrier is locked to be stationary, and to a second mode, where the planetary carrier is freey rotable.

The above described problems are solved and the objects achieved by means of a special planetary gear transmission according to the invention, characterized by what is set forth in the characterizing part of claim 1.

Among the most important advantages of the invention is the possibility to reach an extremely high ratio of transformation, so that with one and the same gear, there can be easily and steplessly reached for instance transmission ratios within the range of 1:10–1:1 or even higher, if necessary. A second advantage of the invention is that only a slight amount of power is consumed in said adjusting of the transmission ratio, and according to a preferred embodiment of the invention, the power loss is made nearly nonexistent. A third advantage of the invention is the possibility to realize the planetary gear transmission, when necessary, in a form where one or several of the transmission ratios can during operation and according to the situation at hand be locked in a fixed position and again released to be variable by following a simple procedure. When locked in a fixed position, the planetary gear transmission according to the invention operates in principle in similar fashion as a gear transmission with a fixed transmission ratio, i.e. accurately and always with minimal power losses. However, the stepless planetary gear transmission according to the invention is extremely simple and secure in operation.

BRIEF DESCRIPTION OF THE DRAWINGS

The invention is explained in more detail below, with reference to the appended drawings.

FIG. 2 illustrates a second embodiment of the planetary gear transmission without a ring gear according to the invention, where the gears are arranged in mutually fixed positions, seen from the side and in partial cross-section, in a similar configuration as in FIG. 1A.

FIG. 3 illustrates a third embodiment of the planetary gear transmission without a ring gear according to the invention, where the gears are arranged in mutually fixed positions, seen from the side and in partial cross-section, in a similar configuration as in FIGS. 1A and 2.

FIG. 4 illustrates a fourth embodiment of the planetary gear transmission without a ring gear according to the invention, seen from the side and in partial cross-section, in a similar configuration as in FIGS. 1A, 2 and 3.

FIGS. 7A–7B illustrate a seventh embodiment of the planetary gear transmission without a ring gear according to the invention, where the input shaft and the output shaft are mutually exchangeable, and certain transmission ratios can be locked, seen from the side and in partial cross-section, in a similar configuration as in FIGS. 1A and 2–5.

FIGS. 8A–8D$_2$ illustrate an eighth embodiment of the planetary gear transmission without a ring gear according to the invention, where the input shaft and the output shaft are mutually exchangeable, and the motor power can be conducted, in addition to the sun gears, also to the planetary carrier, where the connecting of the gears can be adjusted during operation, and certain transmission ratios can be locked, seen from the side and in partial cross-section, in similar configuration as in FIGS. 1A, 2–5 and 7A–7B. FIGS. 8B$_1$, 8C$_1$ and 8D$_1$ illustrate the planetary gear transmission as a whole, whereas FIGS. 8B$_2$, 8C$_2$ and 8D$_2$ only illustrate an alternative position of the coupling transmission that forms part of the planetary gear transmission.

FIGS. 9A–9B illustrate a ninth embodiment of the planetary gear transmission without a ring gear according to the invention, where the input shaft and the output shaft are exchangeable, the motor power is conducted directly to the planetary carrier, and where certain transmission ratios can be locked, seen from the side and in partial cross-section, in a similar configuration as in FIGS. 1A, 2–5 and 7A–8D$_2$.

BEST MODE FOR CARRYING OUT THE INVENTION

Figures 1A, 1B:
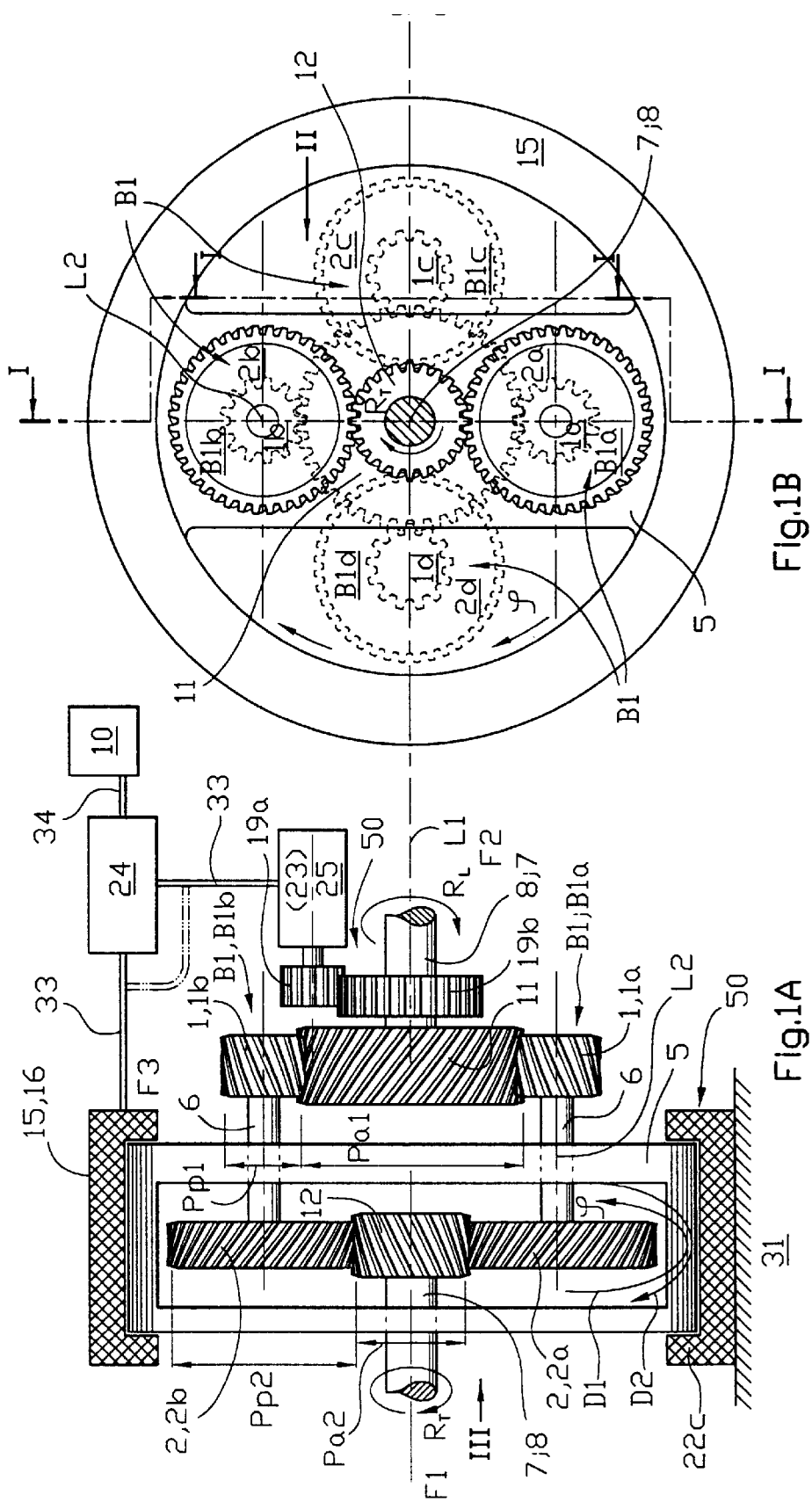
FIG. 1A illustrates a first embodiment of the planetary gear transmission without ring gear wheels according to the invention, where the gears are at mutually fixed positions, seen from the side and in partial cross-section along the planes I—I of figure 1B, from the direction II.
FIG. 1B illustrates, by unbroken and dotted lines, the embodiment of FIG. 1, seen from the end, from the direction III of FIG. 1A, and by additional dotted point lines a modification of said embodiment, i.e. additional planetary gears arranged in parallel.

The drawings illustrate planetary gear transmissions where the transmission ratio is variable. In the text no difference is made between the pinions and the gears, because the transmission can be used in both directions. Some of the drawings illustrate planetary gear transmissions where the variable transmission ratio can, when necessary, be locked at a fixed value or values the power and the torque are conducted to the planetary gear transmission by means of rotary input shafts 7 or 8 connected to the sun gears, or via a planetary carrier 5, from the primary motor M illustrated in some of the drawings, which primary motor can in principle be any kind of motor or other power source. The power and the torque are conducted out of the planetary gear transmission on the output shafts 8 or 7 connected to the sun gears, or from the planetary carrier 5. Obviously either one of the shafts marked with the reference numbers 7 and 8 can be the input shaft, in which case the other is the output shaft, i.e., the gear transmission can transmit power and torque in both directions. Consequently, in the description below, said shafts connected to the first and second sun gears 11, 12 are called the first operating shaft 7 and the second operating shaft 8. In case the same gear transmission should be used, in the above-mentioned sense, in both directions, the differences are naturally expressed in the transmission ratios, which are inverted values. Thus, figures IA and 2 are similar as regards the planetary gear transmission proper; the only difference is that the gear transmission of FIG. 1A is a speed reducer, and the gear transmission of FIG. 2 is a speed increaser. In this planetary gear transmission according to the invention, there is provided at least one first sun gear II and, connected thereto, at least one first planetary gear 1 as well as a planetary carrier 5 connecting the planetary gear or gears, more precisely the planetary gears shafts 6, said planetary carrier being arranged to be rotatable around the common rotary axis line L1 of the input and output shafts, the speed of rotation (p, i.e. angular velocity whereof is controlled by means of a suitable braking mechanism or coupling means 50 connected thereto. In a case where planetary gear transmission really comprises only one first planetary gear 1 or only one pair of planetary gears B1 to be explained below, which pair of planetary gears is attached with bearings to the planetary carrier, as is illustrated in FIG. 4 by unbroken lines and in FIG. 3, the planetary carrier must be attached with bearings to the housing of the gear transmission, like the first and second operating shaft in a way not illustrated in the drawings. Likewise, in the case of two pairs B1a and B1b of planetary gears, as in the embodiments illustrated in FIGS. 1A, 2 and 3, a similar bearing arrangement of the planetary carrier to the housing is necessary. In the case of several pairs of planetary gears, for instance in the case of three pairs Bla, BIb and B1c of planetary gears, or four pairs B1a, B1b, B1c and B1d of planetary gears, the attaching of the planetary carrier with bearings to the gear transmission housing, not illustrated in the drawings, is not absolutely necessary, because the planetary gears are centralized in the sun gear 11 or sun gears in 11, 12. However, even in this case it is advantageous to use bearings.

It is particularly pointed out that the planetary gear transmission according to the invention does not include ring gear wheels, i.e. a group of planetary gears arranged on a given plane—neither the first planetary gears 1 nor the second planetary gears 2—are not simultaneously connected to a gear wheel that were concentric with the sun gears. Thus the planetary gear of the invention does not have any ring gear wheel, but the group of first planetary gears 1 is only connected to the externally or internally toothed sun gear, and the second group of planetary gears 2 is only connected to the externally or internally toothed sun gear, and/or the planetary gears are mutually connected. To put it more precisely, in this specification the term 'connect' and possible variations thereof are used to mean the capability of transmitting the power and torque of the rotary motion between the gear wheels, caused by the mutually meshing toothing of said gear wheel. In other words, for example two gear wheels are mutually connected, when the rotary motion of one gear wheel sets also the second gear wheel that is immediately connected thereto in rotary motion, by intermediation of the meshing toothings of the wheels, at the same angular velocity or at another angular velocity. In this specification and in the appended drawings, the references 1 and 2 denote to the first and second planetary gears in general, and the references 3 and 4 denote to the third and fourth planetary gears in general; the reference B1 denotes to the primary pair of planetary gears in general. The specified references 1a, 1b, 2a; B1a etc. are only used when single corresponding parts must be distinguished for the sake of clarity. Moreover, according to the invention neither of the sun gears II, 12 is braked with respect to the housing 31, but they are rigidly attached to the first operating shaft and respectively to the second operating shaft 7, 8.

Further, the planetary gear transmission of the invention—according to the first principle of structure—comprises at least one second planetary gear 2, which is placed on the shaft 6, rigidly attached to one of the first planetary gears 1, in which case said first and second planetary gear constitute a first pair B1 of planetary gears, as in FIG. 3. If the planetary gear transmission includes two first planetary gears 1a and 1b, and two second planetary gears 2a and 2b, they form, on two shafts 6, two first pairs B1a and B1b of planetary gears, as is illustrated in FIGS. 1A and 2. FIG. 1B illustrates a structure provided with four first planetary gears 1a, 1b, 1c and 1d, and two second planetary gears 2a, 2b, 2c and 2d, so that there are formed four pairs B1a, B1b, B1c and B1d of planetary gears, i.e. generally a pair B1 of planetary gears. Said two pairs B1a and B1b of planetary gears, or respectively four pairs B1a, B1b, B1c and B1d are arranged in parallel with respect to the moment transmitted through the gear transmission n. It should be appreciated that said pairs of planetary gears arranged in parallel can also be three or more than four. In each first pair B1 of planetary gears, the first and second planetary gears 1 and 2, non-rotatably attached to the common shaft 6, rotate together at the same angular velocity, i.e. the shaft 6 of the pair of planetary gears, complete with both planetary gears 1 and 2, i.e.$6+1a+2a$, $6+1b+2b$, etc., rotates around the common planetary carrier 5. The above mentioned first sun gear 11 is axially attached to a first operating shaft 7 or to a second operating shaft 8, so that the rotary motion of the sun gear is equal to or opposite to the rotary motion of said shaft. A planetary gear conforming to these structural principles also comprises a second sun gear 12, which is connected to the second set of planetary gears and is axially attached to the second operating shaft 8 or respectively to the first operating shaft 7, so that the rotary motion of the sun gear is equal or opposite to the rotary motion of said shaft. Consequently, the first planetary gears 1 of each first pair B1 of planetary gears—secondary planetary gears in the examples illustrated in the drawings—are connected to the first sun gear 11, and the second planetary gears 2—primary planetary gears in the examples illustrated in the drawings—are connected to the second planetary gear 12.

In particular, according to the invention, the planetary gear transmission comprises one or more coupling means 50 in order to take the whole rotary power F1, F2 or part F2, F3 thereof out of the planetary gear and/or respectively in order to feed the whole rotary power F1, F2 or part F2, F3 thereof to the planetary gear, in a way to be described in more detail below. Said power output and/or input is carried out according to either of the alternative ways described in the following. According to the first alternative, the rotary power F1, F2 or part F2, F3 thereof proceeds via the first or the second operating shaft 7; 8 to the planetary gear or out thereof. According to the second alternative, the rotary power F1, F2 or part F2, F3 thereof proceeds via the planetary carrier 5 to the planetary gear or out thereof. In addition to the coupling means 50 mentioned above, as a combination with them, the planetary gear transmission according to the invention comprises at least one operation element 15, 16, 17, 23, 24, 25, 26, 37 in order to adjust the rotary velocity (p of the planetary carrier 5 at least in a first position where the planetary carrier is locked to be stationary, and in a second position, where the planetary carrier is freely rotatable. The coupling means 50 are, according to a first structural embodiment of the invention, shifting gears 41a, 42a connected to a ring toothing 43, 44 formed in the planetary carrier, which shifting gears can be connected to the ring toothing, in which case the above mentioned transmission of the powers F1, F2 and F3 to or from the planetary carrier is possible, whereafter the connection can be released, so that powers are not transmitted to the planetary carrier. This structural embodiment is best suited to a situation where steplessly variable transmissions should be locked at certain points.

According to the second structural embodiment of the invention, the coupling means 50 are ring toothings 22a of the planetary carrier, together with countergear wheels 22b connected thereto, or direct connections 22c, which are continuously connected to the planetary carrier, in which case said transmission of the powers F1, F2, F3 to or from the planetary carrier is enabled by using a separate adjusting element or corresponding means. The described structural embodiment is suited to a continuously stepless adjusting.

The maximum transmission ratio of the planetary gear, or in a reversed case, the minimum transmission ratio, is defined according to a method known as such on the basis of the functional diameters of the sun gears and the planetary gears, because the maximum transmission ratio/minimum transmission ratio is created in a case where the planetary carrier 5 is stationary in the first position, i.e. its speed of rotation φ=0, i.e. it is locked in place. In order to obtain a transmission ratio other than one in the above described structure, where first planetary gear pairs B1 are arranged in parallel between the first and second sun gear, the functional diameter Pa1 of the first sun gear 11 must be different from the functional diameter Pa2 of the second sun gear 12 Pa2, and in addition, in the planetary gear pairs B1 the functional diameter Pp1 of the first planetary gears 1 is respectively different from the functional en diameter Pp2 of the second planetary gears 12. When the functional diameter Pa1 of the first sun gear 11 is larger than the functional diameter Pa2 of the second sun gear 12, the functional diameter Pp1 of the first planetary gears 1 smaller than the functional diameter Pp2 of the second planetary gears 12. Precisely speaking, the sum of the functional diameters of the first sun gear and the first planetary gear is equal to the sum of the functional diameters of the second sun gear and the second planetary gear, i.e. [Pa1+Pp1]=[Pa2+Pp2].

Moreover, the planetary gears 1 and 2 of the first planetary gear pairs B1a, B1b, B1c, B1d, in case there are two or more pairs, have the same ratio Pp1:Pp2 of the functional diameters, in order to enable the different-sized planetary gears rotating at different angular velocities to be connected to common sun gears. The simplest way to realize this is to make the first set of planetary gears 1a, 1b, 1c etc. and the second set of planetary gears 2a, 2b, 2c etc. mutually equal in size with respect to the functional diameter. By following these measures, the common axial line L1 of the first and second operating shaft 7, 8 and the center lines L2 of the shafts 6 of the planetary gears are parallel, and the axial lines L2 of the planetary gears are placed at equal distances from the axial line L1 of the first and second operating shaft, and all first planetary gear pairs rotate at the same angular velocity. In general, the extreme value for the transmission ratio P with the described simple planetary gear is formed as follows: [Pp2/Pa2]×[Pa1/Pp1] or [Pp1/Pa1]×[Pa2/Pp2], the obtained value whereof at the reducer is readily $P_{min}$=1:10, and in the increaser the obtained value is readily $P_{max}$=10:1. Because the planetary carrier 5 rotates essentially at the same velocity $R_T$ as the first operating shaft 7 when the planetary carrier is not at all slowed down, i.e. the planetary carrier is in the second position freely rotatable, in which case φ=$R_T$, also the second operating shaft 8 rotates at the same velocity as the planetary carrier, i.e. the limit transmission value $P_{limit}$=1:1. Now the transmission is direct, so to speak. This means that the transmission ratio varies steplessly within the range 10:1–1:1 or within the range 1:10–1:1. According to a general definition, the rotating speed $R_L$ of the second functional diameter of the output side in a planetary gear without a ring gear wheel, comprising two sun gears and a group of one set of planetary gear pairs—the planetary gear transmissions illustrated in FIGS. 1A, 2–3 and 7A–8D$_2$ without the elements arranged as extensions to the planetary gear—can be calculated on the basis of the rotating velocities of the various components according to the following formula: $φ_o=P×φ_I-(P-1)×φ$. In the formula $φ_o$ is the angular velocity of the output shaft, i.e. the second operating shaft 8, and $φ_I$ is the angular velocity of the input shaft, i.e. the first operating shaft 7, (p is the circumferential velocity of the planetary carrier 5, and P is the transmission ratio, when the possible rotation of the planetary carrier is left out, i.e. it is stationary. According to the invention, the speed of rotation (p of the planetary carrier 5 can also be raised higher than that of the first operating shaft 7 and/or the speed of rotation $R_T$ of the second operating shaft 8, i.e. φ>$R_T$, in which case the maximum transmission ratio $P_{max}$ is increased or decreased with respect to the limit transmission ratio $P_{limit}$, depending on whether the gear in question is a reduction or increaser. By employing a planetary gear transmission with the same structure and measures, by which there were achieved the transmission ratios mentioned at the end of last chapter, there are now achieved steplessly varying transmission ratios, for example within the range 10:1–1:5 or respectively within the range 1:10–5:1. Here the former value is obtained in a situation where the planetary carrier is placed in the first position, i.e. φ=$R_T$, and the latter value is obtained in a situation where the velocity of the planetary carrier 5 is increased in the same first direction D1 in which the input shaft, i.e. the first operating shaft rotates, i.e. φ>$R_T$; this is called the third position of the planetary carrier. Further, it is possible not only to stop the planetary carrier 5, but to force it or accelerate its speed of rotation φ in a direction D2, opposite to the rotation $R_T$ of the first operating shaft, i.e. in this case the input shaft, which means that φ=$R_M$. Said other velocity $R_M$ can, in the first place, be between zero and –$R_T$, i.e. 0>$R_M$>–$R_T$, which means the same velocity as that of the input shaft, but in the opposite direction D2. This is the fourth position of the planetary carrier. Secondly, the other velocity $R_M$ can be lower than –$R_T$, i.e. $R_M$<–$R_T$, which means a higher velocity than that of the input shaft, i.e. the first operating shaft, but in the opposite direction D2, because φ=|$R_M$|>|–$R_Y$|. This is the fifth position of the planetary carrier. Said latter alternatives explained above are used mainly for adjusting the axial torque rendered by the gear transmission, rather than its transmission ratio P.

The planetary gear transmission according to the invention may—according to the principles of another structure—comprise at least one shaft structure 30a, where for example one diagonal shaft 18a is attached, by a first universal joint 13, to a second operating shaft 8 or respectively to a first operating shaft 7, and by a second universal joint 14 respectively attached to the shaft 6 of the first planetary gear 1, as is illustrated in FIG. 4. The diagonal shaft 18a of the shaft structure rotates at the same angular velocity $R_T$ as the input shaft/output shaft, and further said first planetary gears 1 rotate at the same angular velocity as the diagonal shaft. Now the obtained extreme value for transmission ratio P of the planetary gear is either [Pp1/Pa1] or [Pa1/Pp1], the resulting value in the reducer being readily $P_{min}$=1:4, and the resulting value in the increaser being readily $P_{max}$=4:1. Even here, the limit transmission ratio $P_{limit}$=1:1, in which case the transmission ratio varies steplessly within the range 4:1–1:1 or within the range 1:4–1:1. Depending on the axial torque to be transmitted, said planetary gear may also comprise a second or several shaft structures 30b, the diagonal shafts 18b whereof are attached to the first operating shaft 8 by universal joints 13, or respectively to the second operating shaft 7. Respectively, the structure comprises other first planetary gears 1, to the shafts 6 whereof the diagonal shafts 18b are attached by universal joints 14. The diagonal shafts 18; 18a, 18b etc. all rotate at the same angular velocity, and at the same velocity RT as the input or output shafts and at the same velocity as said first planetary gears.

According to the invention, the rotation speed φ of the planetary carrier 5 common to the first planetary gears 1 and the second planetary gears 12 is controlled so that on one hand, as an extreme value, it may remain stationary, for instance locked in place, in which case the speed or rotation φ of the common planetary carrier 5 φ=0, and on the other hand, it may at its extreme value rotate at the same velocity as the input shaft, i.e. the first or second operating shaft 7, 8, in the first direction of rotation D1, in which case the speed of rotation ϕ of the planetary carrier 5 $\phi=R_T$. In the case of FIGS. 1A–3 and 5, said first direction of rotation D1 of the planetary carrier is the same as the speed of rotation RT of the first operating shaft, and the same as the speed of rotation $R_L$ of the second operating shaft, because between the first and the second operating shaft, there is an odd number of symmetrical planetary gear pairs B1. On the other hand, in the case of FIG. 4, the first rotary direction D1 of the planetary carrier is opposite to the rotary direction and velocity $R_L$ of the second operating shaft. Moreover, the speed of rotation of the planetary carrier 5 can be steplessly i.e. slidably maintained at any value between said values, in other words $0 \leq \phi \leq R_T$. Because it is possible that one common planetary carrier 5 rotates in some cases, for instance in a situation where the other operating shaft has a high load, while the input shaft rotates at a relatively high speed in the other direction D2, which is opposite to said first direction, the planetary carrier is braked also in this direction, when necessary, down to another velocity $\phi \leq R_M$, which may in magnitude also be slidable within the range $0 \leq \phi \leq -R_T$, although generally $R_M << -R_T$. By bringing energy to the planetary carrier, its speed of rotation can be altered and directed to outside the ranges mentioned above, as was explained earlier in this specification.

The planetary gear transmission according to the invention is used—according to the first principle of operation—so that the selected transmission ratio P is chosen among a number of predetermined transmissions, said number being limited at each moment to for instance to three, four or five, etc. In principle, among an infinite group of stepless transmission ratios, there is chosen a limited number of given transmission ratios, for instance by means of a gear transmission structure, and consequently during operation, only said given transmission ratios can be utilized. According to a preferred embodiment of the invention, this is carried out by connecting the actuating shaft 47, to which the primary motor M is coupled so that it generates the whole rotary force F1, to rotate either one of the operating shafts 7 or 8 or the planetary carrier 5 in different ways. Consequently, as an extension of the planetary gear transmission, there is arranged a coupling transmission 60, the first and second axle gears 51, 52 whereof are connected to said first operating shaft 7 and respectively to the second operating shaft 8; in addition, there are also arranged, on the actuating shaft 47 and the running shaft 48 rotary, movable first and second shifting gears 41a, 42a; 41b, 42b that rotate therealong. Said movable first and second shifting gears are for example rigidly attached to the actuating shaft 47 and respectively to the running shaft 48, so that the shifting is carried out by axially moving the actuating shaft and/or the running shaft, or as an alternative said shiftable first and second shifting gears 41a, 42a; 41b, 42b are in the axial direction slidably but in the rotary direction rigidly attached to the actuating shaft and respectively to the running shaft, in which case the shifting is carried out by moving the shifting gears along said shafts 47, 48. The actuating shaft 47 and the running shaft 48 are geared to the housing of the device, so that the shifting gears rotate, still keeping their positions. Thus the first and the second shifting gears 41a, 42a; 41b, 42b can be connected alternatively either to the first or to the second axle gear 51, 52. As a result, the first operating shaft 7 of the planetary gear transmission is in the first case arranged to serve as the actuating shaft and the second operating shaft 8 is arranged to serve as the running shaft, and respectively in another case the second operating shaft 8 is arranged to serve as the running shaft and the second operating shaft 8 is arranged to serve as the actuating shaft. Thus both operating directions of the planetary gear are utilized both as reduction and increasers. Said shifting gears are shown in FIGS. 7A–8D₂. The axle gears 51, 52 and the shifting gears 41a, 42a; 41b, 42b of the coupling transmission 60 can be chosen to give the desired standard transmission ratios according to the target of usage of the planetary gear transmission.

Further, the planetary carrier comprises two ring toothings 43, 44, for instance outside the first and second sun gear 11, 12, in the direction of the rotation axial line LI thereof, and in addition, the first operating shaft 7 comprises a third sun gear 103 rigidly attached thereto, and respectively the second operating shaft 8 comprises a fourth sun gear 104 rigidly attached thereto. By axially shifting the first operating shaft, there are obtained two positions; in the first position, the first sun gear 11 is connected to the first planetary gears 1, but the third sun gear is not connected, and in the second position the first sun gear is not connected, but the third sun gear 103 is connected to the first ring toothing 43 of the planetary carrier. In a corresponding manner, by axially shifting the second operating shaft, there are obtained two positions; in the first position, the second sun gear 12 is connected to the second planetary gears 2 but the fourth sun gear is not connected, and in the second position the second sun gear is not connected but the fourth sun gear 104 is connected to the second ring toothing 44 of the planetary carrier. In this case the planetary gear transmission, complete with the coupling means, also comprises an axle guide 49, which is for example a sleeve-like shaft arranged coaxially between the first and the second operating shaft, said axle guide 49 extending to the planetary gear, between the first and second sun gear 11, 12 and between the third and fourth sun gear 103, 104, and where a fifth and sixth sun gear 105, 106 are rigidly attached to. The fifth sun gear 105 corresponds to the first sun gear 11 in that both are connected to the planetary gears and connectably exchangeable, and the sixth sun gear 106 corresponds to the second sun gear 12 in that both are connected to the planetary gears and connectably exchangeable. The first sun gear 11 can be changed to the fifth sun gear 105 and vice versa, and the second sun gear 12 can be changed to the sixth sun gear 106 by using an axial motion of the axle guide 49 in the direction of the rotation axial line L1. The size of the ring toothing 43, 44 and of the third and fourth sun gears 103, 104 connected thereto does not affect the transmission ratio.

The clutches, which are generally referred to by the reference number 37, are constructions that engage two elements detachably to each other, in which case at least the second element, with the clutch disengaged, is free to rotate, and when the clutch is engaged, both elements are in the same motional mode. Only if it is necessary to distinguish a single clutch, there are used more precise reference numbers 37a–37e. The clutch is characterized, among others, in that the most important operation modes are on and off (On⇌Off), and that the energy losses, i.e. heat production, are attempted to be at the minimum, opposite to the brakes. In this case the operation means comprise a second clutch 37e, which alternatively locks the above described axle guide 49 to be stationary, or releases it to be freely rotatable, so that the fifth and respectively the sixth sun gear 105, 106 are engaged to be nonrotatable, when they are connected to the first or respectively the second planetary gears, as is illustrated in FIGS. 8C₁, and 8D₁. Said operation means also comprise a first clutch n 37a, which alternatively locks the planetary carrier 5 to be stationary, as is shown FIG. 8B₁, or releases it to be freely rotatable at the angular velocity ϕ, as is seen in FIGS. 8A, 8C₁, and 8D₁. An embodiment of the principle described above is seen in FIGS. 8A–8D₂.

Next we shall explain in more detail the operation of the planetary gear transmission illustrated in FIGS. 8A–8D$_2$. The transmission ratio P is given as a value between the first operating shaft 7 and the second operating shaft 8, and the influence of the coupling transmission 60 is left unobserved. In FIG. 8A, both operating shafts 7, 8 are engaged directly to the planetary carrier 5 by means of the ring toothings 43, 44 and the third and fourth sun gears 103, 104, in which case the transmission is 1:1, when the planetary carrier is rotary, and when the planetary gears 1, 2 are detached from the sun gears. In FIG. 8B, the planetary carrier 5 is locked to be stationary by a clutch 37$a$, and the operating shafts—when the first operating shaft 7 is connected to the actuating shaft 47, i.e. to the input of the gear transmission, and the second operating shaft 8 is connected to the running shaft 48, i.e. to the output of the gear transmission–are connected to the first and second sun gears 1, 2, so that the transmission is 1:P. In FIG. 8B$_2$, the situation is the same in other respects, except that the roles of the operating shafts—when the first operating shaft 7 is connected to the running shaft 48, i.e. to the output of the gear transmission, and the second operating shaft 8 is connected to the actuating shaft 47, i.e. to the input of the gear transmission—are exchanged, in which case the transmission is reversed 1:1/P. In FIG. 8C$_1$, the fifth and sixth sun gears 105, 106 are connected to the first and second sun gears 1, 2 while the axle guide 49 of the fifth and sixth sun gears is locked stationary by a clutch 37$e$, so that the transmission is 1: (1−1/P) when the planetary carrier 5 is freely rotatable. In FIG. 8C$_2$, the situation is otherwise identical to the one described above, except that the roles of the operating shafts are exchanged in the described manner, in which case the transmission is reversed 1: (1/(1−1/P)). Thus we have obtained five different transmissions, which all rotate the running shaft 48 in the same direction, when the rotary direction of the actuating shaft 47 remains unchanged. Said transmissions can function for instance as forward gears. In FIG. 8D, the third sun gear 103 is connected to the first ring toothing 43 of the planetary carrier, and the fifth sun gear 105 is connected to the first planetary gears, while the axle guide 49 is locked to be stationary by the clutch 37$e$, and the second sun gear 12 is connected to the second planetary gears, so that the transmission is 1: (1−P), i.e. in an opposite direction as compared to the former cases, while the planetary carrier 5 is rotary. In FIG. 8D$_2$, the situation is the same as above, except that the roles of the operating shafts are exchanged in the manner described above, in which case the transmission is reversed 1: (1/(1−P)). We have thus obtained two different transmissions, both of which rotate the running shaft 48 in the same direction, which direction is opposite to the rotary direction of said fifth transmissions when the rotary direction of the actuating shaft 47 remains unchanged for all seven transmissions. The two latter transmissions can function for instance as reverse gears. When the actuating shaft 47 is connected to a power source, for instance to a combustion engine, it is found out that by adjusting the value of the planetary gear transmission ratio P to be within the range 0,3–0,5, preferably of the order 0.4, the obtained covering percentage—i.e. the ratio of the lowest rotary speed of the largest transmission and the highest velocity of the smallest transmission—is about 80%. This kind of planetary gear transmission is thus suitable to be used in connection with combustion engines, and its efficiency is of the same order as that of regular gear wheel arrangements operated with fixed transmissions, but it is remarkably higher than for example the efficiency of the variators. It should be understood that planetary gear transmission may also comprise smaller parts in order to obtain a smaller amount of transmission, and that the above described functions can also be realized by means of different structural arrangements.

Consequently, said operation means may also comprises a third clutch 37$c$, which alternatively locks the planetary carrier to the first operating shaft 7 or releases it, and/or a fourth clutch 37$b$, which alternatively locks the planetary carrier to the second operating shaft 8 or releases it, as is seen in FIGS. 7A and 9A. In the specification above, in connection with FIGS. 7A–9B, we have described planetary gear transmissions where the operating shafts 7, 8 and consequently also the actuating shaft 47 and the running shaft 48, i.e. the input and output shaft, are arranged on the same side of the gear transmission, but it should be understood that the input and output of corresponding planetary gear transmissions according to the first principle of operation can also be arranged on opposite sides of the gear transmission, analogically with the situation illustrated in FIGS. 1A–6.

The planetary gear transmission according to the invention is used—according to the second principle of operation—so that at each given moment, the transmission ratio P is chosen to be or allowed to be set at a given, exact value, from a basically infinite number of stepless transmission ratios. Hence, nothing else is predetermined, except for the extreme values and adjusting method of the transmission ratios. According to this principle of operation, the adjusting of the rotation velocity of the planetary carrier can first of all be arranged by braking it either by an electric generator 15 or by a hydraulic or pneumatic pump 16, which can be an air turbine or a liquid turbine, or by a friction brake 17 or a spring 28, so that energy is accumulated therein, to be consumed later or in another purpose, or by a combination thereof. The use of an electric generator and pneumatic or hydraulic pumps is advantageous, because then the energy separated in the braking can be stored in an electric or pressure accumulator 10, and/or the energy separated in the braking can be conducted to the output shaft 7, 8, or by means of a supplementary motor 25, by intermediation of gear wheels 19$a$ and 19$b$, as is illustrated in FIG. 1A, or it can be conducted to the power mains 35, as is shown in FIG. 2. The electric or pressure accumulator 10 is connected to the generator 16 or pump 15 by conduits 34 and further to the electric motor 16 or hydraulic or pneumatic motor 15, as well as to a possible AC inverter 24 or torque converter 23 by conduits 34, such as electric wires or pipes. For the reason described above, said braking mechanisms 15, 16, 17 are advantageously made so that they function equally well in both rotary directions of the planetary carrier, i.e. both in the first rotary direction D1 and in the second, opposite rotary direction D2. The second gear wheel 19$a$ is arranged on the supplementary motor shaft, and the second gear wheel 19$a$ is arranged on the output shaft 7, 8. Thus the supplementary motor 25, when running raises the power of the output shaft 7, 8, and consequently there is hardly any power loss, except for what is caused by the internal efficiency of the electric, hydraulic or pneumatic components. For the supplementary motor 25, there is obtained a suitable speed of rotation, i.e. rpm, corresponding to the output shaft for instance by means of an AC inverter 24 or an torque converter 23 of the supplementary motor, in which case the speed of rotation $R_L$ of the output shaft is not increased, but the obtained axial torque grows. The axial torque converter included in the supplementary motor, or a combination of an AC inverter and supplementary motor, is connected by conduits 33, such as electric wires or fluid pipes, to the pump 16 or to the electric generator 17.

In another embodiment, the adjusting of the rotation velocity of the planetary carrier can be arranged by accelerating it either by means of an electric motor 15 or a hydraulic or pneumatic motor 16, or by a combination thereof. The energy-accumulating spring 28 mentioned in the previous chapter can now be used for increasing the power F1 or F2, F3 to be fed in the planetary gear transmission. The use of an electric, pneumatic or hydraulic motor is advantageous because in that case the energy that is earlier accumulated in an electric or pressure accumulator 10 can now be utilized and fed in the planetary carrier 5. The above described arrangement is particularly advantageous, because in principle the electric motor and the electric generator are one and the same apparatus, i.e. a combined electric motor and generator 15, and in principle the hydraulic or pneumatic motor and the pump are one and the same apparatus, i.e. a combined hydraulic /pneumatic motor and pump 16. Thus it is possible to use a known electric motor and generator combinations 15 and/or a combined hydraulic/pneumatic motor and pump 16. It is also possible to use any other secondary motor 26 in order to realize the above-described functions. In general, said motor and generation combination, said motor and pump combination and secondary motor, as well as a possible torque converter or AC inverter are called braking and accelerating mechanisms 15, 16; 26; 23; 24, 25, 27, 28. It should be understood that even if the braking and accelerating mechanisms 15, 16, 26; 23; 24, 25, 27, 28 are defined, the practical application may be such that only one of these is realized. Thus the definition braking and accelerating mechanism means that when necessary, the apparatus is capable of both of these mutually opposite functions.

When following another principle of operation, the planetary gear transmission according to the invention can be used for instance in wind power stations in a way that shall be illustrated with respect to FIG. 2. Now the employed primary motor M is the wind power station rotor accumulating wind energy, i.e. rotation power F1, the axis of which rotor constitutes the input shaft, i.e. the first operating shaft 7. To the output shaft, i.e. to the second operating shaft 8, there is connected the primary generator G, and in addition, to the planetary carrier 5 there is connected for example ring toothings 22a and countergear wheels 22b, as well as possible additional gear wheels by using a secondary generator 15, so that the transmission is designed as an increaser, different from the drawings. By means of these generators, the rotary forces F2, F3 are taken out of the planetary gear transmission. The primary generator G and the secondary generator 15 are adjusted so that the speed of rotation of the primary generator G feeding electric power to the power mains 35 remains constant at an accuracy required of the mains frequency, and the secondary generator 15 feeds power to the mains, while the wind velocity is higher than the optimum velocity, and serves as an auxiliary motor, i.e. accelerates the rotation of the planetary carrier, while the wind velocity is lower than the optimum velocity. By means of this arrangement, there is achieved a better efficiency than with other known arrangements, among others. Thus, in the described second principle of operation, there are two generators, i.e. means for braking the planetary gear transmission, in order to take parts of the rotation forces F2, F3 out of the planetary gear transmission in the form of another type of energy, although the electric coupling formed therebetween can also be used for accelerating one of them. An analogical but inverted method of usage would be to arrange in the planetary gear two motors to feed energy therein, which method corresponds to the one illustrated in FIG. 2, if the generators are replaced by motors and motors by generators. Hence, in this case, the rotary forces F2, F3 are brought onto the second shaft 8 of the planetary gear transmission and to the planetary carrier 5 by the motor 25 and respectively by the motor 15 or 26, and the force F1 is taken out to the desired target of usage. It is pointed out that there can also be used other types of motors than electric motors, such as different combustion engines, water turbines etc. The ratio of the forces F2 and F3 fed in the planetary gear transmission can be adjusted between the motors 25 and 15 or 26, either electrically by a suitable control unit, such as an AC inverter 24 or a voltage and/or current adapter, viscous coupling, an equalizer or differential gear or Torsen-gear transmission, all of which are referred to by the reference number 27.

Among the many transmission possibilities of the planetary gear transmission according to the invention, let us point out the assistance in the starting of a combustion engine. For this purpose, a start wire is connected to rotate the input shaft 8, 7, and between the input shaft and the planetary carrier, there is arranged a spring 28, such as a spiral spring. When the start wire is pulled for the first time, the spring 28 accumulates energy, and when pulling the start wire for the second time, the energy accumulated in the spring is released, in which case the motor to be started obtains the sum of the spring force and the manual pulling force. This makes the starting easier, particularly if the required force for overtaking the compression stroke of the combustion engine is high.

The braking of the planetary carrier 5 is controlled by means of an adjuster or controller, not illustrated in the drawings, which can represent any known or new type and which keeps the rotation velocity $\phi$ of the planetary carrier at a such a value that the speed of rotation $R_L$ of the output shaft is set at the desired value. The chosen type of the adjuster/controller is affected by the type of the primary motor M, as well as the target of usage of both the motor and the gear arrangement. The motorgenerator 15, the motorpump 16, the secondary motor 26 and another, possible auxiliary brake 17 can be placed directly on the circumference of the planetary carrier 5, as is seen in FIGS. 1A and 3–5, or by intermediation of the gear wheels 22a, 22b, as is seen in FIG. 2.

Figure 6:
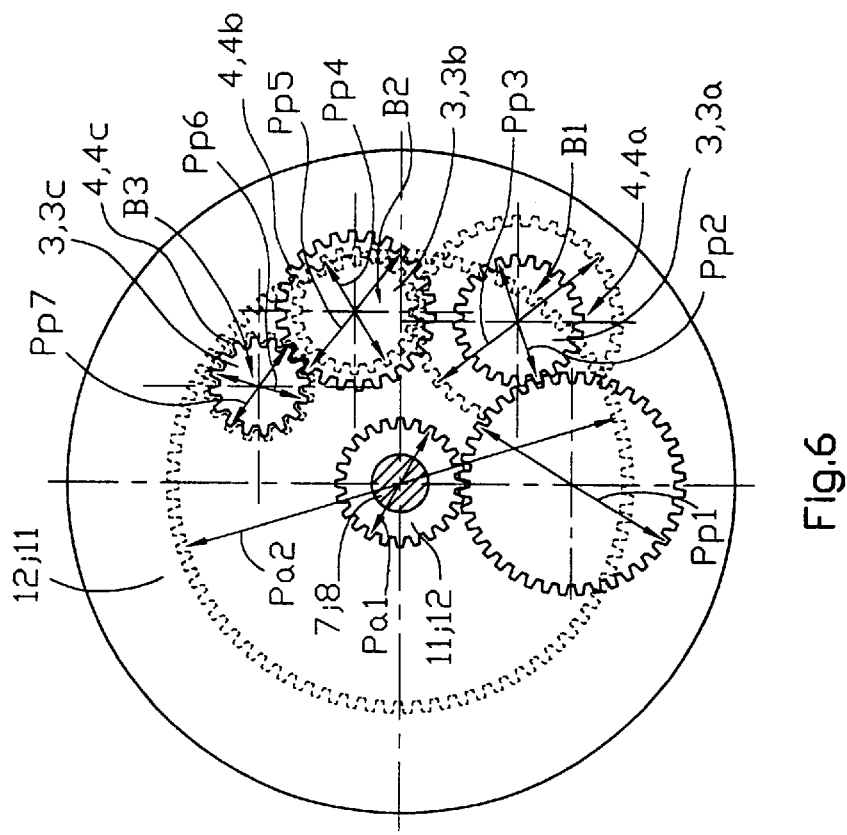
FIG. 6 illustrates a sixth embodiment of the planetary gear transmission without a ring gear according to the invention, where several pairs of planetary gears are arranged in series, seen from the end, in a similar configuration as in FIG. 1B.
Figure 5:
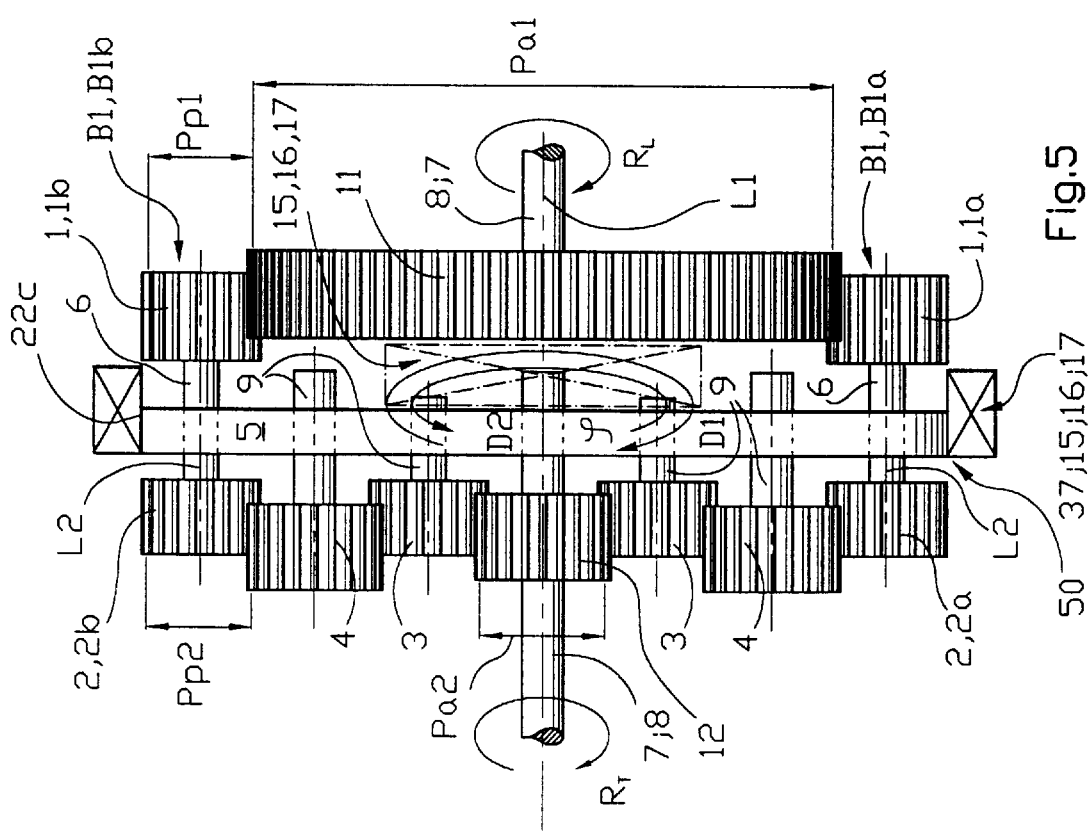
FIG. 5 illustrates a fifth embodiment of the planetary gear transmission without a ring gear according to the invention, where the gears are arranged in mutually fixed positions, seen from the side and in partial cross-section, in a similar configuration as in FIGS. 1A and 2–4.

In addition to the first planetary gear pairs B1, the planetary gear transmission according to the invention may comprise third planetary gears 3 and/or fourth planetary gears 4, which are connected to the first sun gear 11 and to the first planetary gears I arranged therebetween, and/or to the second sun gear 12 and the second planetary gears 2 arranged therebetween, as is shown in FIG. 5. These rotary planetary gears 3, 4 that rotate independently of the rest of the planetary gears do not change the transmission ratio, but when necessary, they can be used to mutually adjust the rotary directions and/or circumferential velocities of the other gear wheels. In order to further increase or decrease the transmission ratio, the third planetary gears 3a—and possible additional third planetary gears 3b and 3c—as well as the fourth planetary gears 4a having a difference functional diameter as compared to them—as well as the possible, additional fourth planetary gears 4b and 4c—can be interconnected by common shafts, so that the third planetary gears 3a, 3b, 3c and the fourth planetary gears 4a, 4b, 4c form first planetary gear pairs B1, second planetary gear pairs B2, third planetary gear pairs B3 or even more planetary gear pairs, in each of which the planetary gears 3a and 4a, 3b and 4b, 3c and 4c rotate at the same angular velocity, but in different planetary gear pairs at different angular velocities. Said planetary gear pairs B1, B2 and B3 etc. are arranged in series with the first or second planetary gear 1 or 2 or with the first planetary gear pair B1 and with each other, as is schematically illustrated in FIG. 6. Now the obtained total transmission ratio is for instance [Pa1/Pp1]× [PP2/Pp3]×[Pp4/Pp5]×[Pp6/Pp7]×[Pp7/Pa2], so that the obtained extreme values $P_{max}$ and $P_{min}$ of the transmission ratio P can be for example 40:1 or 1:40 or higher or respectively lower. Even in this case, the limit transmission ratio $P_{limit}$ is 1:1 and the maximum transmission ratio $P_{max}$ also is defined in a first and/or second direction D1, D2 from the velocity of the planetary carrier, as is explained above.

The above described braking and accelerating mechanisms 15, 16, 26 of the planetary carrier 5 can be placed either between the planetary carrier 5 and the housing 31 of the gear arrangement, as is shown by unbroken lines in FIGS. 1A–4 and 5, or between the planetary carrier 5 and either one of the sun gears 11 or 12, as is shown by dotted point lines in FIG. 5. The sun gears 11, 12 can both be provided with external toothing, as is illustrated in FIGS. 1A–5, or the second sun gears 11 or 12 can be provided with internal toothing, as illustrated in FIG. 6. Naturally, when necessary, both of the sun gears 11, 12 can be provided with internal toothing. Moreover, it should be understood that irrespective of the side on which the toothing is arranged —whether the toothing is external or internal—the sun gears 11 and 12, which are rigidly connected to the first operating shaft 7, 8 and to the second operating shaft 8, 7 i.e. which rotate at the rotation velocities $R_T$ and $R_L$ of the input and output shaft respectively, are by nature explicitly sun gears and not ring gear wheels, as was already pointed out.

According to the above specification, in the planetary gear transmission of the invention, the sun gears and planetary gears of the gear transmission can be continuously connected to each other, or the sun gears and planetary gears can be disengaged from their mutual connection, and particularly the planetary gears can then be arranged to be connected to an auxiliary sun gear or sun gears. Planetary gear transmissions according to the invention can also be connected in series, for instance so that the planetary carrier 5 of the first planetary gear transmission is connected, by means of toothing transmission, to the input shaft of the second planetary gear transmission, i.e. to the first operating shaft 7 thereof, and the output shaft of the first planetary gear transmission, i.e. the second operating shaft 8, is connected by means of toothing transmission to the planetary carrier 5 of the second planetary gear transmission. In this arrangement connected in series, the first and the second planetary gear transmissions can represent any of the types described in this specification, and their transmissions can be adjustable or controllable by any of the above described methods and means, independently or dependently. In the planetary gear according to the invention, forces can be fed and taken out as well as transferred between the different parts of the planetary gear by using different forms of energy, such as mechanical or kinetic energy, electric energy, the flowing energy of any kind of medium, heat energy or even radiation energy, etc.

What is claimed is:

1. A planetary gear transmission with a variable transmission ratio, without a ring gear wheel, including:
 a first sun gear arranged on a first operating shaft and at least one first planetary gear connectable thereto;
 a second sun gear arranged on a second operating shaft and at least one second planetary gear connectable thereto;
 planetary shafts rigidly attaching each of the second planetary gears to one of the first planetary gears, in which case the first and second planetary gears form first planetary gear pairs, where the planetary gears rotate at the same angular velocity; and
 a planetary carrier common to the first and second planetary gears;
the planetary gear transmission comprising, as a combination:
 at least one coupling means for taking out at least some rotary force from the planetary gear transmission, and/or for feeding the rotary force into the planetary gear transmission, via said first or second operating shaft, or via the planetary carrier; and
 at least one operation means for controlling the rotation velocity of the planetary carrier at least to a first mode, where the planetary carrier is locked to be stationary, and to a second mode, where the planetary carrier is freely rotable, wherein
 said coupling means are ring toothings of the planetary carrier with respective countergear wheels, or direct couplings; and
 said operation means are steplessly braking and accelerating mechanisms, by means of which the rotation velocity of the planetary carrier is controlled between any of the velocities: a zero velocity, and the same velocity as that of the first operating shaft in a first direction, and a higher velocity than that of the first operating shaft in said first direction, and other velocity in an opposite second direction.

2. A planetary gear transmission of claim 1, wherein the functional diameter of the first sun gear is different from the functional diameter of the second sun gear; and the functional diameter of the first planetary gears is respectively different from the functional diameter of the second planetary gears.

3. A planetary gear transmission of claim 2, wherein while the functional diameter of the first sun gear is larger than the functional diameter of the second sun gear, the functional diameter of the first planetary gears is smaller than the functional diameter of the second planetary gears.

4. A planetary gear transmission of claim 2, further comprising two or more planetary gear pairs arranged in series with respect to the same functional diameters and connectable to the first and second sun gear.

5. A planetary gear transmission of claim 4, further comprising third planetary gear pairs and/or more planetary gear pairs, where the planetary gears rotate at the same angular velocity, and which are arranged in series with the first and second planetary gear pairs.

6. A planetary gear transmission of claim 2, further comprising third planetary gears and/or fourth planetary gears connected to the first sun gear and to the first planetary gears therebetween, and/or to the second sun gear and to the second planetary gears therebetween; and the third and fourth planetary gears form second planetary gear pairs, in each of which the planetary gears rotate at the same angular velocity, and which are arranged in series with the first planetary gear pairs.

7. A planetary gear transmission of claim 1, wherein the mechanism for braking and accelerating the planetary carrier is an electric motor-generator, and/or an hydraulic/pneumatic motor-pump, and/or another secondary motor, and/or another secondary motor, and/or a combination of a supplementary motor and an optional AC inverter, and/or a possible torque converter for the supplementary motor; and the electric motor-generator or hydraulic/pneumatic motor-pump or other secondary motor is arranged to be operable in both rotary directions.

8. A planetary gear transmission of claim 7, wherein the braking and accelerating mechanism of the planetary carrier is connected between said planetary carrier and either the housing or one of the sun gears.

9. A planetary gear transmission of the claim 7, further comprising electric conduits or fluid pipes in order to conduct the energy separated at the braking to an efficiency-increasing supplementary motor located on the second operating shaft.

10. A planetary gear transmission of the claim 7, wherein the second operating shaft is provided with a primary generator for feeding power to the mains, and a secondary generator is connected to the planetary carrier, for feeding the power generated by the rotation of the planetary carrier to the mains, or in order to erated by the rotation of the planetary carrier to the mains, or in order to accelerate the rotation of the planetary carrier.

11. A planetary gear transmission of claim 1, wherein said other velocity in the opposite second direction is at maximum equivalent with the opposite velocity corresponding to the velocity of the first operating shaft, or at least as high as said opposite velocity.

12. A planetary gear transmission of any of the claim 1, further comprising an electric or pressure accumulator for storing the energy separated at the braking of the planetary carrier and for feeding energy in order to accelerate the rotation velocity of the planetary carrier.

13. A planetary gear transmission of claim 1, comprising at least a spring between one of the operating shafts and the planetary carrier.

14. A planetary gear transmission with a variable transmission ratio, without a ring gear wheel, including:
  a first sun gear arranged on a first operating shaft and at least one first planetary gear connectable thereto;
  a second sun gear arranged on a second operating shaft and at least one second planetary gear connectable thereto;
  planetary shafts rigidly attaching each of the second planetary gears to one of the first planetary gears, in which case the first and second planetary gears form first planetary gear pairs, where the planetary gears rotate at the same angular velocity; and
  a planetary carrier common to the first and second planetary gears;
the planetary gear transmission comprising, as a combination:
  at least one coupling means for taking out at least some rotary force from the planetary gear transmission, and/or for feeding the rotary force into the planetary gear transmission, via said first or second operating shaft, or via the planetary carrier; and
  at least one operation means for controlling the rotation velocity of the planetary carrier at least to a first mode, where the planetary carrier is locked to be stationary, and to a second mode, where the planetary carrier is freely rotatable
  a coupling transmission with:
    first and second axle gears thereof attached to said first operating shaft and to the second operating shaft respectively; and
    an actuating shaft and a running shaft thereof provided with movable first and second shifting gears, which are alternatively connectable to the first and second axle gears, in order to change the first operating shaft of the planetary gear transmission to operate with the actuating shaft or with the running shaft, and respectively in order to change the second operating shaft to operate with the running shaft or with the actuating shaft and vice versa.

15. A planetary gear transmission of claim 3, wherein said coupling means are:
  shifting gears connectable to the ring toothing of the planetary carrier; or
  a third and a fourth sun gear on the first and respectively second operating shaft and connectable to at least one ring toothing of the planetary carrier.

16. A planetary gear transmission of claim 15, further comprising an axle guide, which in the axial direction extends in the planetary gear, between the first and second sun gear, and between the third and four the sun gear, and which has a fifth and a sixth sun gear; and the fifth sun gear corresponds to the first sun gear and the sixth sun gear corresponds to the second sun gear.

17. A planetary gear transmission of claim 16, wherein by an axial motion of the axle guide, the first sun gear can be exchanged to the fifth sun gear and vice versa, and that the second sun gear can be exchanged to the sixth sun gear and vice versa.

18. A planetary gear transmission of claim 15, wherein said operation means comprise a first clutch, which alternatively engages the planetary carrier to be stationary or disengages it to be freely rotatable.

19. A planetary gear transmission of claim 16, wherein said operation means comprise a second clutch, which alternatively engages the axle guide to be stationary or disengages it to be freely rotable.

20. A planetary gear transmission of claim 15, wherein said operation means comprise a second clutch, which alternatively engages the axle guide to be stationary or disengages it to be freely rotable.

21. A planetary gear transmission of claim 14, wherein said operation means comprise a third clutch, which alternatively engages the planetary carrier to the first operating shaft or disengages it, and/or a fourth clutch, which alternatively engages the planetary carrier to the second operating shaft or disengages it.

22. A planetary gear transmission of claim 14, wherein the functional diameter of the first sun gear is different from the functional diameter of the second sun gear; and the functional diameter of the first planetary gears is respectively different from the functional diameter of the second planetary gears.

23. A planetary gear transmission of claim 22, wherein while the functional diameter of the first sun gear is larger than the functional diameter of the second sun gear, the functional diameter of the first planetary gears is smaller than the functional diameter of the second planetary gears.

24. A planetary gear transmission of claim 22, further comprising two or more planetary gear pairs arranged in series with respect to the same functional diameters and connectable to the first and second sun gear.

25. A planetary gear transmission of claim 24, further comprising third planetary gear pairs and/or more planetary gear pairs, where the planetary gears rotate at the same angular velocity, and which are arranged in series with the first and second planetary gear pairs.

26. A planetary gear transmission of claim 22, further comprising third planetary gears and/or fourth planetary gears connected to the first sun gear and to the first planetary gears therebetween, and/or to the second sun gear and to the second planetary gears therebetween; and the third and fourth planetary gears form second planetary gear pairs, in each of which the planetary gears rotate at the same angular velocity, and which are arranged in series with the first planetary gear pairs.

* * * * *

UNITED STATES PATENT AND TRADEMARK OFFICE
CERTIFICATE OF CORRECTION

PATENT NO.    : 6,527,671 B2
DATED         : March 4, 2003
INVENTOR(S)   : Paalasmaa et al.

It is certified that error appears in the above-identified patent and that said Letters Patent is hereby corrected as shown below:

Title page,
Item [56], References Cited, FOREIGN PATENT DOCUMET "DE", "66235" should be -- 666235 --

Column 2,
Lines 18-31, "The object… small in size" should be deleted
Line 34, "marginal" should be -- margin --
Line 39, "n" should be deleted
Line 54, "planetyary" should be -- planetary --
Line 65, "freey" should be -- freely --
Lines 66 & 67 and Column 3, lines 1 and 2, should be deleted Column 4,
Line 30, after "values" -- . -- should be inserted and "the" should be -- The --
Line 48, "IA" should be -- 1A --
Line 53, "II" should be -- 11 --
Line 59, "p" should be -- 0 --

Column 5,
Line 7, "Bia,Bib" should be -- Bla, Blb --
Line 45, "II" should be -- 11 --

Column 6,
Line 40, "(p" should be -- 0 --

Column 7,
Lines 61 and 65, "(p" should be -- 0 --

Column 8,
Line 28, "Ry" should be -- $R_T$ --
Line 58, "RT" should be -- "$R_T$" --

Column 9,
Line 2, "(p" should be -- 0 --
Line 5, "RT" should be -- $R_T$ --

Column 10,
Line 10, "LI" should be -- L1 --

UNITED STATES PATENT AND TRADEMARK OFFICE
CERTIFICATE OF CORRECTION

PATENT NO. : 6,527,671 B2
DATED : March 4, 2003
INVENTOR(S) : Paalasmaa et al.

It is certified that error appears in the above-identified patent and that said Letters Patent is hereby corrected as shown below:

<u>Column 11,</u>
Line 11, "8B" should be -- $8B_1$ --
Line 37, "8D" should be -- $8D_1$ --

<u>Column 14,</u>
Line 48, "I" should be -- 1 --

<u>Column 17,</u>
Line 66, "claim 3" should be -- claim 14 --

<u>Column 18,</u>
Line 9, "four the" should be -- fourth --

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,527,671 B2
DATED : March 4, 2003
INVENTOR(S) : Paalasmaa et al.

It is certified that error appears in the above-identified patent and that said Letters Patent is hereby corrected as shown below:

Column 2,
Line 62, after "at least", please insert -- one operation means for controlling the rotation velocity of the planetary carrier at least --.

Signed and Sealed this

Twenty-fifth Day of January, 2005

JON W. DUDAS
*Director of the United States Patent and Trademark Office*